United States Patent [19]

Potucek

[11] Patent Number: 4,684,022

[45] Date of Patent: Aug. 4, 1987

[54] FASTENER STRIP

[75] Inventor: Frank R. Potucek, Des Plaines, Ill.

[73] Assignee: Duo-Fast Corporation, Franklin Park, Ill.

[21] Appl. No.: 14,425

[22] Filed: Feb. 23, 1979

Related U.S. Application Data

[60] Continuation of Ser. No. 845,076, Oct. 25, 1977, abandoned, which is a division of Ser. No. 614,759, Sep. 18, 1975, which is a division of Ser. No. 387,443, Aug. 10, 1973, Pat. No. 3,915,367.

[51] Int. Cl.$^4$ .............................................. B65D 85/24
[52] U.S. Cl. ..................................... 206/347; 206/820
[58] Field of Search .............. 206/347, 338, 343, 346, 206/820, 330; 85/32; 151/7, 41.71, 41.73, 21, 41.75

[56] References Cited

U.S. PATENT DOCUMENTS

| | | | |
|---|---|---|---|
| 2,150,194 | 3/1939 | Thomas | 151/7 |
| 2,387,983 | 10/1945 | Dickenson | 206/820 |
| 2,588,372 | 3/1952 | Erb | 85/32 R |
| 2,620,008 | 12/1952 | Mallard | 206/343 |
| 2,783,674 | 3/1957 | Becker | 151/41.71 |
| 2,784,405 | 3/1957 | Working, Jr. | 206/347 |
| 3,904,032 | 9/1975 | Maier | 206/347 |

Primary Examiner—Steven M. Pollard
Attorney, Agent, or Firm—Mason, Kolehmainen, Rathburn & Wyss

[57] ABSTRACT

A strip of fasteners is formed by an elongated flexible web having one or two rows of tabs projecting from one or both of the longitudinal edges of the web. These tabs have fastener holding means formed at their ends for removably carrying nails, screws, or nuts. In one form, the holding means are detachable with the fasteners to provide a washer, and in another form, the detachable end of the holding means provides a locking insert for a self-locking nut. The web is formed both as a strip and as a closed loop. In some embodiments, the fastener is disposed at an angle relative to the web to permit inclination of the strip of loop relative to horizontal while presenting the fasteners to a driving station in a vertical position. A fastener feeding mechanism deflects or bends the strip at a point adjacent the drive path of a fastener driver to "fan out" the fastener carrying tabs so that the tab or tabs carrying the fastener in driving position are spaced from adjacent tabs. In one embodiment, a reciprocating motor in the feeding mechanism retracts the portion of the strip adjacent the drive path to insure that the tab is not inadvertently fastened to a workpiece by the driven fastener.

19 Claims, 15 Drawing Figures

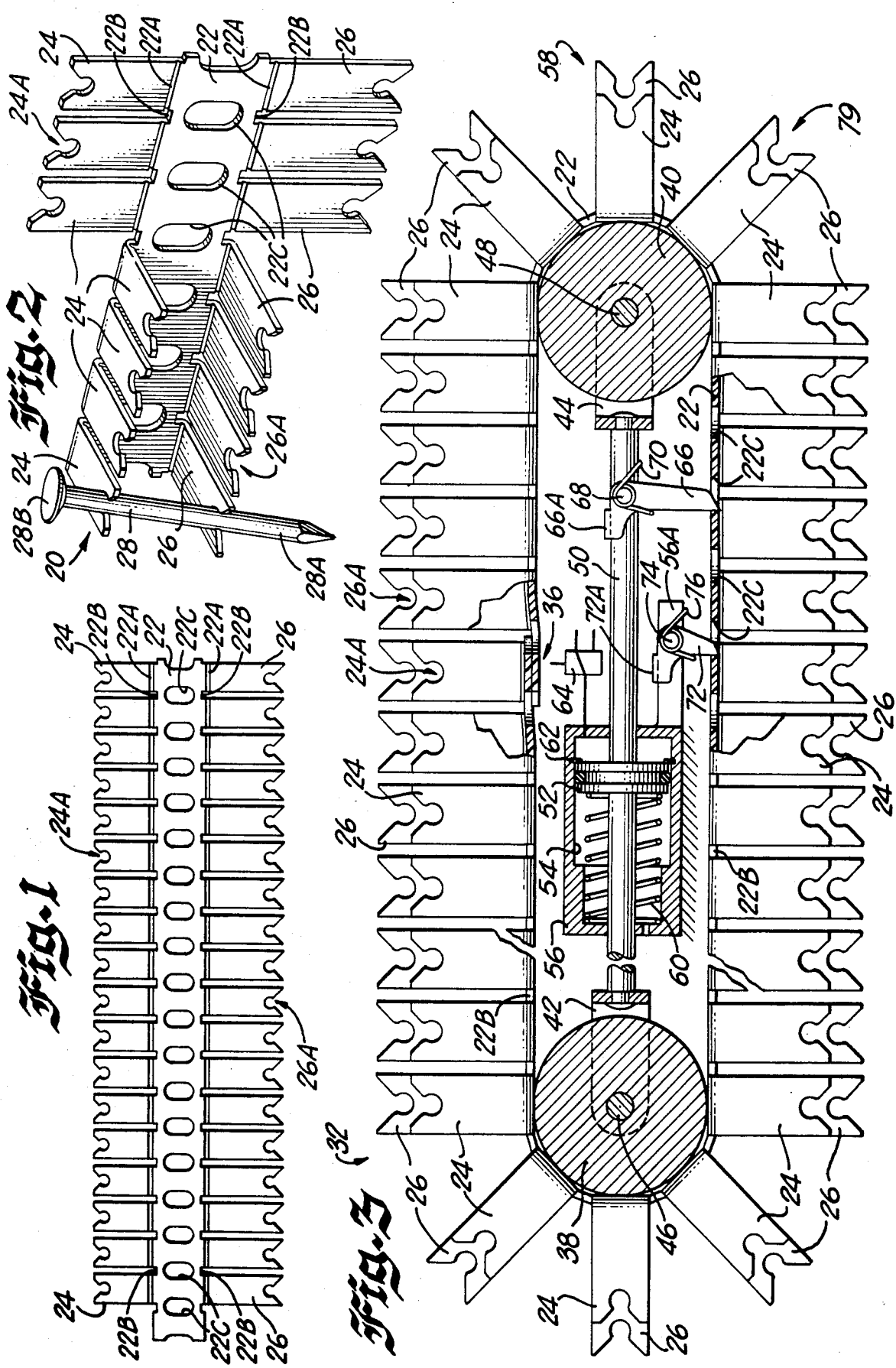

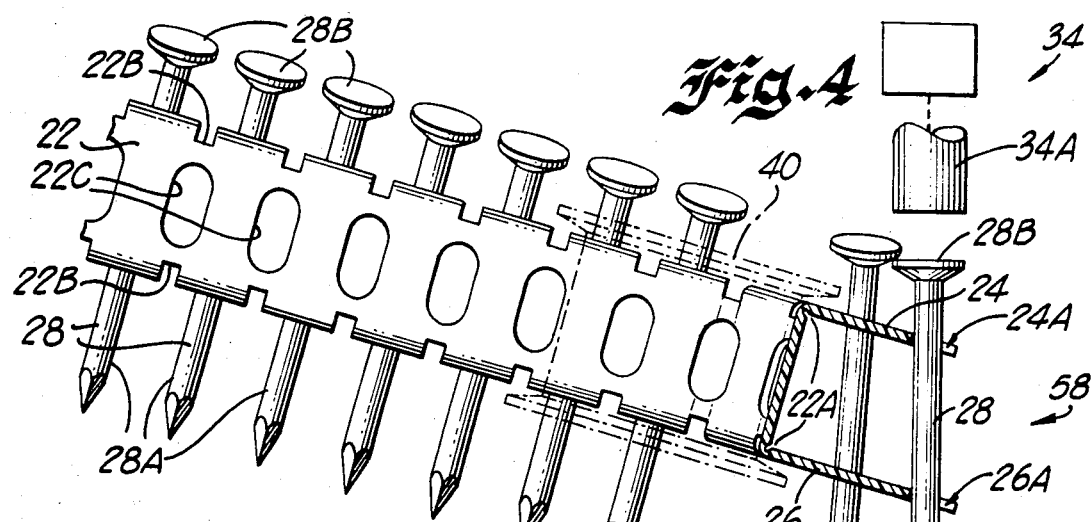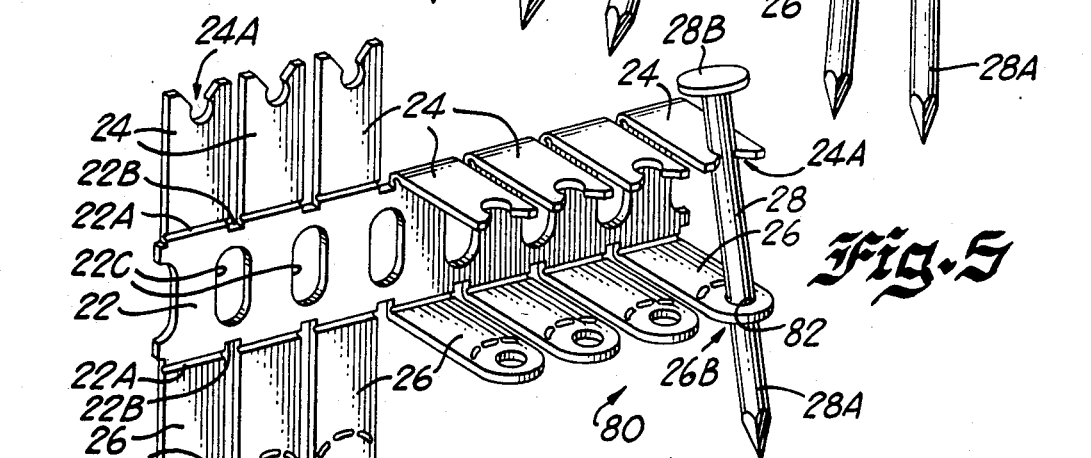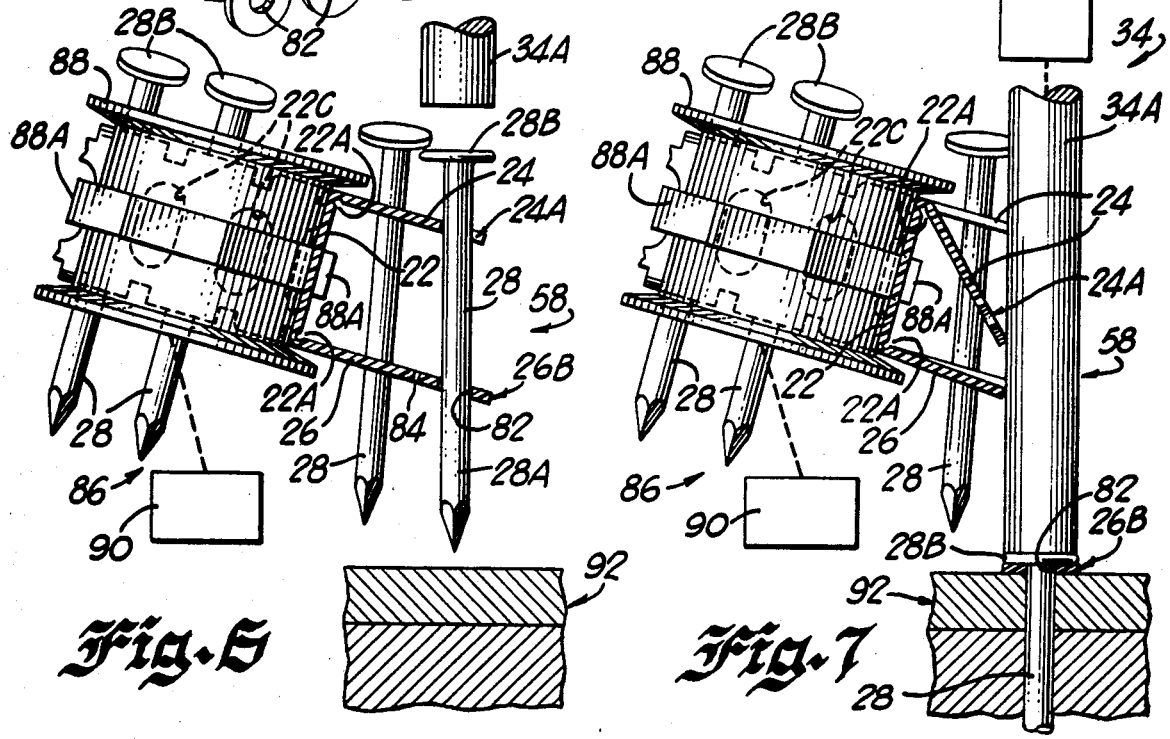

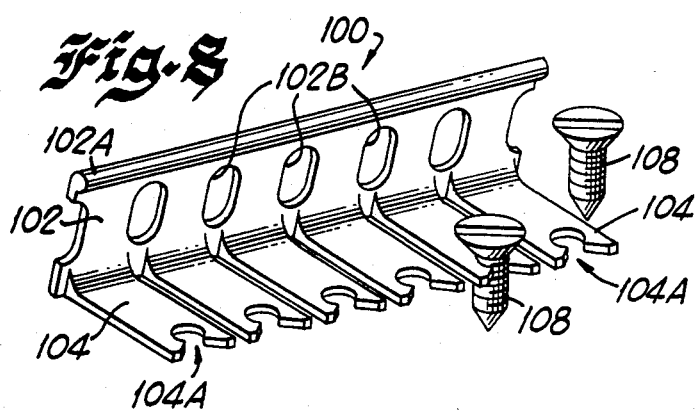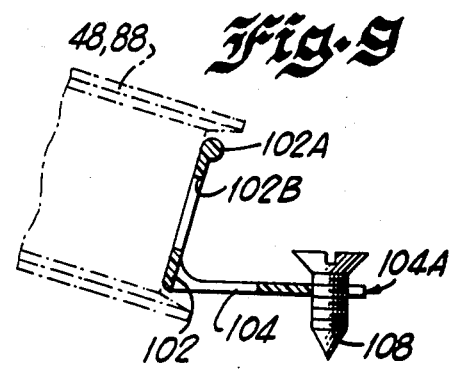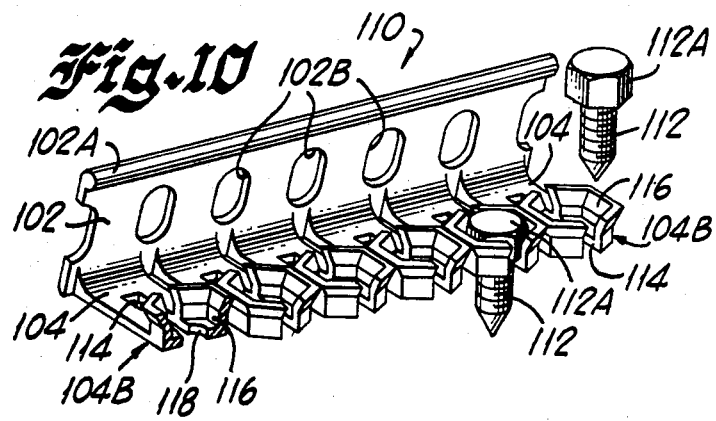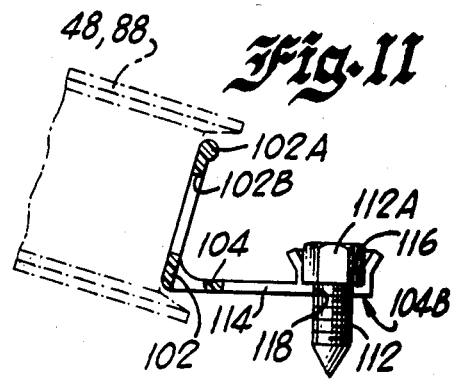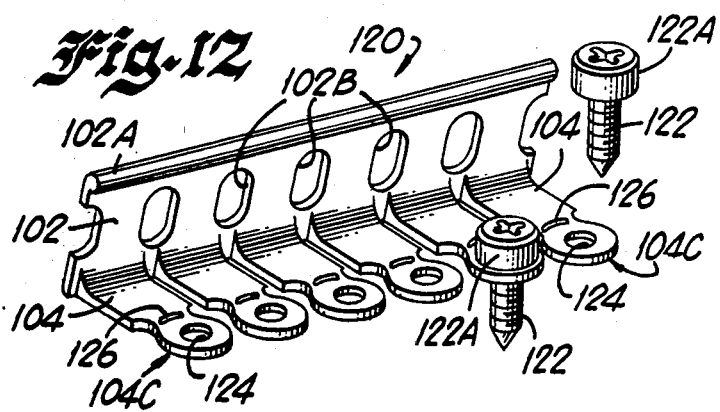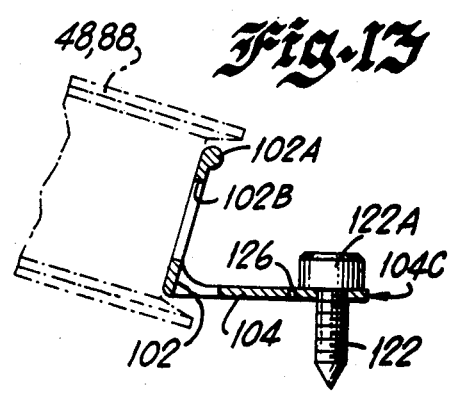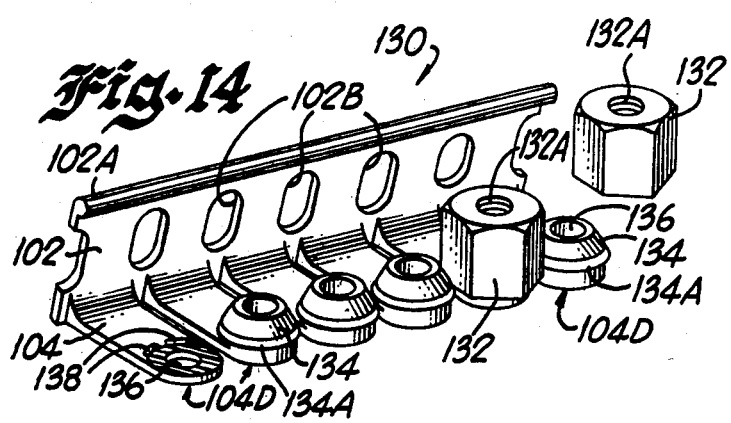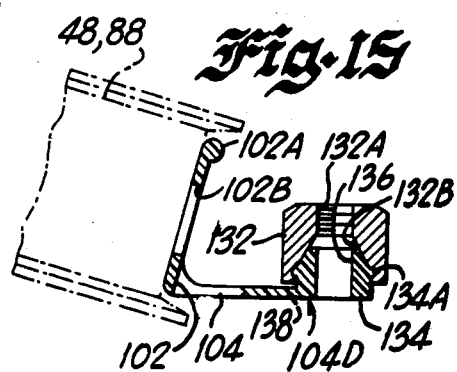

FASTENER STRIP

CROSS-REFERENCE TO RELATED APPLICATION

This is a continuation patent application of copending patent application Ser. No. 845,076 filed on Oct. 25, 1977, now abandoned, which is a division of application Ser. No. 614,759 filed on Sept. 18, 1975, which is a division of application Ser. No. 387,443 filed Aug. 10, 1973, now U.S. Pat. No. 3,915,367.

This invention relates to an assemblage of power-driven fasteners and a fastener driving tool therefor and, more particularly, to a new and improved strip of fasteners and assemblies for feeding and driving such fasteners.

A strip of fasteners carried on a pair of tabs or legs projecting from opposite edges of a flexible web is shown and described in U.S. Pat. No. 3,438,487. These fasteners are driven, as shown in said patent, by feeding the strip rectilinearly past a drive track so that the heads of successive fasteners are disposed beneath a driver element. When the driver element moves downwardly, the fasteners are removed from the tabs or legs and driven into the workpiece without trapping spurious material from the strip beneath the heads of the fasteners. However, this feeding arrangement requires the fasteners to be spaced apart no less than the effective width of the driver element at the point of contact with the fastener head. It would, therefore, be desirable to provide a feeding arrangement in which the fasteners are spaced apart at the point of contact with the driver element while permitting the fastener heads to be closely adjacent or even overlapped in the strip so as to increase the fastener density on the strip. It would also be desirable to provide a strip of the type shown in the above-identified patent in which different types of fasteners or different sizes can be used and in which the strip is so formed as to facilitate the provision of a clearance between the magazine for the fastener driving tool and the workpiece.

Accordingly, one object of the present invention is to provide a new and improved assemblage or strip of fasteners.

Another object is to provide a fastener strip including an elongated flexible web with at least one row of projecting tabs removably mounting fasteners at an angle relative to the plane of the web.

Another object is to provide a new and improved means for feeding successive fasteners from a strip into the drive path of the fastener driver in which the space between adjacent fasteners or their supports is increased over that normally provided in the strip.

A further object is to provide a fastener feeding assembly using an elongated flexible web with at least one row of projecting tabs carrying fasteners in which the assembly deflects or bends the web to fan out the tabs adjacent the driver so as to position the fastener in the drive path of the driver and spaced from adjacent fassteners or fastener supports.

Another object is to provide such a fastener feeding assembly including means for retracting the strip or strip tabs from the drive path during the driving operation.

A further object is to provide a new and improved self-locking nut and method of making a strip or assemblage of such nuts.

In accordance with these and many other objects, an embodiment of the invention comprises a new and improved strip of fasteners formed by an elongated flexible web having one or two rows of spaced tabs projecting transversely from one or both longitudinal edges of the webs. The free ends of the tabs which project generally transverse to the plane of the web are provided with fastener receiving or holding means for removably receiving a fastener such as a nail, screw, or nut. This strip can be formed as an endless length or as a closed loop. To permit the magazine for a fastener driving tool to be inclined upwardly away from the workpiece so as to provide greater clearance for reaching "tight corners", the fasteners are disposed on the tab at an acute angle with respect to the plane of the web. In strips or loops using two projecting rows of tabs, the lengths of the tabs are made differently to provide the inclination. In strips having only a single row of tabs, the tabs project at an acute angle from the plane of the web.

The holding means on the tabs are provided in various configurations. In some, the holding means on the free ends of the tabs releasably retain the fastener so that it is separated from the strip during the driving operation. In other embodiments, the holding means is joined to the fastener and is separated from the tab or strip during the driving operation to provide a washer when used with headed fasteners. In another embodiment, the holding means comprises an elastic insert for a nut to provide a strip of self-locking nuts.

To permit the fasteners to be disposed immediately adjacent each other while affording a large clearance between adjacent fasteners or fastener supporting tabs at the driving station, a new and improved feeding assembly is provided which deflects or bends the web about an axis parallel to the web immediately adjacent the driving station. This fans out the tabs so that a fastener disposed in the drive path of the driver element is spaced from adjacent tabs or fasteners carried thereon. In those applications in which the fastener is to become completely separated from the supporting tab, a drive or motor in the feeding assembly retracts the strip during the driving operation.

Many other objects and advantages of the present invention will become apparent from considering the following detailed description in conjunction with the drawing in which:

FIG. 1 is a plan view of the web used to make a strip of fasteners in accordance with the present invention;

FIG. 2 is a perspective view of a partially assembled fastener strip using the web shown in FIG. 1 wherein the fasteners are nails;

FIG. 3 is a schematic plan view of a fastener feeding assembly for feeding a closed loop made from the fastener strip shown in FIG. 2;

FIG. 4 is a fragmentary elevational view in partial section illustrating a portion of the feeding assembly shown in FIG. 3 adjacent a driving station;

FIG. 5 is a perspective view of a modified form of the nail strip shown in FIG. 2;

FIG. 6 is a fragmentary perspective view in partial section showing the strip of FIG. 5 in a feeding assembly adjacent the drive station;

FIG. 7 is a view similar to FIG. 6 illustrating the driving of a fastener from the strip shown in FIG. 6;

FIG. 8 is a perspective view, partially exploded, illustrating an embodiment of the invention using screws with a strip having a single row of legs;

FIG. 9 is a sectional view of the strip shown in FIG. 8;

FIG. 10 is a perspective view, partially assembled, of another single row strip embodying the present invention using a cap screw;

FIG. 11 is a sectional view of the strip shown in FIG. 10;

FIG. 12 is a perspective, partially assembled, view of another embodiment of the invention in which a portion of the strip tab is separated to become a washer for a threaded fastener;

FIG. 13 is a sectional view of the strip shown in FIG. 12;

FIG. 14 is a perspective view, partially assembled, of a strip of self-locking nuts embodying the present invention; and FIG. 15 is a sectional view of the strip shown in FIG. 14.

Referring now more specifically to FIGS. 1 and 2 of the drawings, therein is illustrated a fastener strip which embodies the invention and which is indicated generally as 20. The strip 20 is formed of a length of flexible material of a suitable flexible plastic material such as polypropylene having a generally uniplanar and elongated web or web portion 22 and two rows of tabs 24 and 26 projecting from its opposite longitudinal edges. In the completed strip 20, the tabs 24 and 26 are bent at right angles to the plane of the web to receive and detachably support a plurality of fasteners such as a nail 28. It should be understood that the fastener or nail 28 could as well comprise threaded fasteners such as screws of various types and other similar fasteners. In general, the construction of the strip 20 including the parts 22, 24, and 26, is similar to that described in U.S. Pat. No. 3,438,487, and the nails 28 can be collated on the web and tabs 22, 24, and 26 using any suitable means as, for example, the collating machine shown in U.S. Pat. No. 3,538,673. Thus, the strip 20 can be formed in a running length or in a coil as shown in U.S. Pat. No. 3,450,255.

Referring now more specifically to the plastic elongated member, each of the tab portions 24, 26 is connected to the web 22 by a hinge portion 22A of reduced cross section to facilitate bending the tabs 24, 26 to a position extending generally transverse to the plane of the web 22. In addition, each adjacent pair of tabs 24, 26 is spaced from each other, and the longitudinal edge of the web 22 is provided with a notch or recess 22B. This notch together with an aligned opening 22C defines a transverse hinge portion in the web 22 to permit this web to be bent, flexed, or deflected. The openings 22C can also be used to index or feed the strip assembly 20 and to facilitate tearing segments from the strip 20 following the driving of the fasteners 28 carried thereon.

The outer free end of each of the tabs 24, 26 is provided with a holding means indicated generally as 24A, 26A comprising a generally circular opening for receiving the body of the fastener 28 such as a shank portion 28A of the nail 28. A pair of inclined edges lead into the circular openings to facilitate insertion of the fasteners in the holding means 24A, 26A during the collating operation. Further, the tabs 24 and 26 are formed of different lengths so that when a nail 28 or other fastener is disposed in the holding means 24A, 26A with the tabs 24, 26 offset at right angles to the plane of the web 22, the elongated fasteners 28 are held in a position that is at an acute angle with respect to the plane of the web 22. This inclination permits a length or loop of the strip 20 to be inclined upwardly from horizontal in the magazine for a fastener driving tool while presenting the fastener or nail 28 in a vertical position to a fastener driver as set forth in detail below. In the illustrated embodiment, the tabs 24 are shorter than the tabs 26.

FIGS. 3 and 4 of the drawings illustrate a novel feeding assembly which is indicated generally as 32 for feeding successive fasteners or nails 28 to a fastener driving means shown schematically and indicated generally as 34 (FIG. 4). In the feeding assembly 32 a length of the strip 20 is formed in a closed loop by securing together overlapping ends of the strip 20, as indicated at 36 in FIG. 3. These overlapped ends can be joined by any suitable means such as adhesives or ultrasonic welding. In FIG. 3 the fasteners or nails 28 have been removed from the holding means 24A, 26A on the tabs 24, 26 to facilitate illustration, and the feeding assembly 32 has been shown in a plane, although as shown in FIG. 4 the assembly 32 is disposed upwardly inclined from the horizontal.

The feeding assembly 32 includes a pair of guide structures, wheels or pulleys 38 and 40 rotatably mounted in a pair of U-shaped brackets 42 and 44 by a pair of shafts 46 and 48. The brackets 42, 44 are connected by a piston rod 50 carrying a piston 52 slidably mounted within a cylinder 54 defined by a housing structure 56 forming a part of a fastener driving tool. The pulley or guiding structure 40 is disposed immediately adjacent a driving station indicated generally as 58 in FIGS. 3 and 4. A compression spring 60 interposed between the piston 52 and a wall of the structure 56 normally biases the piston against a circular retaining ring 62 carried on the structure 56 to normally dispose the pulleys 38 and 40 and the strip 20 carried thereon in the position shown in FIG. 3.

With the feeding assembly 32 in the normal position shown in FIG. 3, the nail or fastener 28 at the driving station 58 (FIGS. 3 and 4) is disposed in vertical alignment with a driver blade or element 34A forming a part of the fastener driving means 34 even though the strip 20 or the loop formed by the strip 20 is inclined upwardly from the horizontal. This is due to the fact that the legs or tabs 26 on the web 22 are longer than the tabs 24. The axes of the pulleys 38, 34 defined by the shaft 46, 48 are displaced from vertical through an angle corresponding to the angle of inclination of the fasteners or nails 28 to the plane of the web 22. This permits the feeding assembly 32 to be inclined upwardly from the horizontal, thereby permitting the nosepiece structure of the tool through which the fastener or nail 28 is driven to be inserted into corners and other relatively inaccessible locations.

In addition, by bending, deflecting, or displacing the web 22 of the strip as it approaches the driving station 58, adjacent sets or pairs of tabs 24, 26 carrying the fasteners or nails 28 are fanned out with the result that the fastener or nail 28 carried in the tabs 24, 26 located at the driving station 58 is separated from adjacent pairs of tabs 24, 26 and/or fasteners carried thereon. This permits the use of a driver 34A of substantially greater dimension than a head 28B of a fastener or nail 28 without encountering a problem of clearance between the driver and nails 28 or supporting tabs 24, 26 adjacent the ones at the driving station 58. The web 22 is deflected or displaced about an axis generally parallel to the plane of the web 22 and located at the opposite side of the web 22 from the tabs 24, 26. The degree of deflection required to obtain separation varies in accordance with the spacing of the fasteners 22 on the strip and the separation desired between adjacent supporting tabs 24, 26. In general, as the tabs 24, 26 become shorter, the degree of deflection required to obtain a given separation becomes greater. Conversely, as the length of the tabs 24, 26 becomes longer, the degree of deflection of the web 22 required to produce a given separation becomes less.

With the feeding assembly 32 disposed in the position shown in FIGS. 3 and 4, operation of the driving assembly 34 moves the driver element 34A downwardly (FIG. 4) so that it engages the head 28B of the fastener or nail at the driving station 58 without interfering with adjacent supporting tabs 24, 26 or fasteners 28 carried thereon. As the engaged driver blade 34A and fastener 28 move downwardly, the tabs 24, 26 are deflected downwardly, and the nail shank 28A is withdrawn from the holding means 24A, 26A on these tabs in which it is frictionally retained. At the completion of the driving stroke, the driver blade 34A is retracted by the driving assembly 34, and the feeding assembly 32 is actuated to index or advance the next fastener or nail 28 to the driving station 58. In certain instances in which a very large driver blade 34A is used, it may be desirable to retract the strip 20 and more particularly the supporting tabs 24, 26 at the driving station 58 during the downward movement of the driver blade 34A so as to prevent any possibility that particularly the lower tab 26 might be secured to the workpiece during the driving of the nail or fastener 28.

Accordingly, the feeding assembly 32 includes an arrangement for retracting the tabs 24, 26 at the driving station 58 incident to each driving stroke of the fastener driving means 34 and as an adjunct to indexing the next fastener 28 to the driving station 58. More specifically, the feeding assembly 32 includes a control arrangement shown schematically in FIG. 3 as a pneumatic valve 64 coupled to the right-hand end of the cylinder 54 and normally connecting this right-hand end of the interior of the cylinder 54 to the atmosphere. The valve 64 which can comprise, for example, a port in the cylinder in the driving assembly 34 or a valve mechanically actuated or pneumatically actuated in dependence on the position of the driver blade 34A is operated to an alternative setting supplying pressurized fluid to the cylinder 54 at a point during the fastener driving stroke of the driver blade 34A. The admission of compressed air to the right-hand end of the cylinder 34 moves the piston 52 and the connected pulleys or wheels 38, 40 to the left in FIG. 3. As the wheels or pulleys 38, 40 move to the left, the loop of the fastener strip 20 carried thereon is also moved to the left, and thus the pair of tabs 24, 26 at the driving station 58 are also retracted from the path of movement or the line of the path of movement of the driver blade 34A. This actuation of the valve 64 is preferably so timed that the fastener 28 is at least partially embedded in the workpiece at the time that the tabs 24, 26 carrying this fastener are retracted. This movement of the wheels 38, 40 to the left also condition the feeding assembly 32 to advance the next nail or fastener 28 to the drive station 58.

More specifically, a one-way pawl 66 is pivotally mounted on the piston rod 50 by a pivot pin 68 and is biased by a torsion spring 70 so that a bight or offset portion 66A on the pawl 66 normally bears against the top of the piston rod 50. The free end of the pawl 66 is engaged within an opening 22C in the web 22. A second one-way pawl assembly including a pawl member 72 is pivotally mounted in fixed position on an extension 56A of the housing structure 56 by a pivot pin 74. A torsion spring 76 biases an extension 72A against the upper wall of the extension 56A to hold the lower or free end of the pawl 72 in the normal position illustrated in FIG. 3 in which it is disposed within another of the openings 22C in the web 22.

When the piston rod 50 is moved to the left in the manner described above, the engagement of the pawl 66 with the adjacent wall of the web 22 maintains the position of the web 22 with respect to the pulleys 38, 40. During this movement, the pawl 72 which is pivoted about the fixed position axis provided by the pivot pin 74 is pivoted in a clockwise direction against the bias of the torsion spring 76. The stroke of the piston 52 is equal to the distance separating adjacent openings 22C. Thus, at the end of the stroke of the piston 52, the torsion spring 76 pivots the pawl 72 in a counterclockwise direction into the next following opening 22C. In the feeding assembly 32 illustrated in FIG. 3, the pawls 66 and 72 would occupy adjacent openings 22C in the web 22 at this time.

At the conclusion of the driving operation and when the driver element 34A has been retracted sufficiently to provide complete clearance for the next nail 28 to be moved into the driving station 58, the control valve 64 is released, and the pressurized fluid from the right-hand end of the cylinder 54 is exhausted to the atmosphere. The compression spring 60 then moves the piston 52 to the right so that the piston rod 50 and the pulleys 38 and 40 are moved to the right to the position shown in FIG. 3. During this movement, the pawl 72 engages the wall of the web 62 to retain the strip 20 in a fixed position. Further, during this movement the pawl 66 is pivoted first in a clockwise direction against the bias of the torsion spring 70 and then in a counterclockwise direction by this spring so that its outer free end now engages the next adjacent opening 22C in the web positioned to the right of the one previously engaged. Since the fastener strip 20 was held in a fixed position by the pawl 72 during return movement of the pulleys 38 and 40, the strip 20 is advanced one step by rotating the pulleys 38, 40 in a clockwise direction about the shafts 46 and 48. This moves the next set of tabs 24, 26 carrying a nail 28 into the driving station 58 and moves the set of tabs 24, 26 from which the nail 28 was just driven to the position indicated generally as 79 in FIG. 3.

This operation can be continued until such time as all of the fasteners or nails 28 on the loop of the fastener strip 20 have been depleted. At this time, the loop of the strip 20 is removed from the pulleys 38, 40, and a new strip is placed thereon. The feeding arrangement 32 can also be used with such items as threaded fasteners or nuts mounted on the fastener strip 20. In addition, instead of using a loop of the fastener strip 20, the arrangement using only the pulley 40 can be used to feed a strip from a length or a coil thereof. This arrangement generally requires the provision of a biased take-up on the portion of the fastener strip 20 moving toward the wheel 40. Further, by using legs or tabs 24, 26 of uniform length, the feeding assembly 32 can be disposed substantially perpendicular to the line of movement of the driver 34A or in a horizontal position relative to the vertical movement of the driver 34A.

FIGS. 5-7 of the drawings illustrate a modified form of the strip 20 which is indicated generally as 80 and which provides a plastic washer beneath the head of the fastener. More specifically, the fastener strip 80 is formed in the same manner as the strip 20 except that the holding means 26A for releasably retaining the shank 28A of the nail 28 is modified in the strip 80 to provide a holding means indicated generally as 26B. The holding means 26B comprises a detachable end portion having a center opening 82 and a line of perforations 84 which permit the end portion of the tab 26 to be separated from the remainder thereof during a fastener driving operation. When the strip 80 is formed, the upper portion of the nail shank 28A is detachably or removably mounted in the holding means 24A on the outer end of the tab 24, and the shank 28A is inserted into the opening 82. When the nail 28 is driven, the end portion of the tab 26 becomes severed along the line of perforations 84, and the holding means 26B becomes the plastic washer interposed between the head 28B of the nail and the workpiece.

FIGS. 6 and 7 illustrate an assembly indicated generally as 86 for feeding the strip 80 to the driving station to permit the nail 28 to be driven by the driver blade 34A in the fastener driving means 34. The fastener feeding assembly 86 includes a feed wheel 88 having a plurality of sprocket teeth 88A formed thereon spaced to engage the openings 22C in the web 22. The feed wheel 88 is coupled to a conventional indexing or continuous drive means 90. When the drive means 90 is operated to index or rotate the feed wheel 88, the tabs 24, 26 on the web 22 are fanned in the manner described above so that a single fastener or nail 28 is disposed in the drive station with its head 28B aligned with the driver blade 34A and spaced from the remaining tabs 24, 26 and the fasteners 28 carried thereon.

With the nail at the driving station 58 disposed in the position shown in FIG. 6, the fastener driving assembly 34 (FIG. 7) is placed in operation, and the driver blade 34A begins to move downwardly toward the head 28B of the nail 28 with the nail 28 disposed above a workpiece indicated generally as 92. During the initial portion of the movement of the driver blade 34A, the head 28B of the nail is engaged, and the nail 28 moves downwardly with the shank sliding within the opening 82. After some movement, the head 28B and the shank 28A are cammed out of the holding means 24A in the upper tab 24 as this tab is deflected downwardly as shown in FIG. 7. Further movement moves the head 28B into engagement with the holding means 26B on the lower tab 26. The velocity at which the driver 34A and the nail 28 are moving is sufficient to sever the end portion of the tab 26 along the line of the perforations 84 so that this generally circular or annular end portion moves with the nail 28 beneath the head 28B so as to be driven against the workpiece 92 interposed between the head 28B of the nail and the upper surface of the workpiece 92. When the driver blade 34A is retracted, synchronized operation of the drive means 90 indexes the feed wheel 88 through an additional step to feed the next nail into the driving station 58 with the head 28B of this next nail disposed beneath the driver blade 34A. As indicated above, the strip 80 can be formed with threaded fasteners such as screws which require a rotary movement of the driver 34A as well as reciprocating motion thereof.

FIGS. 8-15 of the drawings illustrate various fastener strips designed for use with fasteners of relatively short axial length. All of the strip configurations illustrated therein can be fed and driven by the means described above with reference to FIGS. 1-7 of the drawings.

Referring now more specifically to FIGS. 8 and 9 of the drawings, therein is illustrated a fastener strip construction which is indicated generally as 100 and which includes an elongated flexible web 102 along the lower edge of which extend a plurality of transverse tabs or legs 104. The legs 104 extend at an acute angle relative to the plane of the web 102 to adapt the strip 100 for use in feeding assemblies which are inclined upwardly relative to the horizontal. The legs or tabs 104 also can be formed to extend substantially at right angles to the plane of the web 102 in the manner of the tabs shown in the above-identified patents. The web 102 is provided with a rib 102A along its upper edge to provide slight stiffening of the web. The web 102 is also provided with indexing or feed openings 102B positioned in the same manner as the openings 22C and designed to provide a hinge axis extending transverse to the length of the web 102 between adjacent pairs of tabs 104. This facilitates the fanning of adjacent tabs 104 when the strip 100 is deflected, as by movement around the curved surface of a feed pulley 48, 88 shown in dot-and-dash outline in FIG. 9. The strip 100 can also be fed rectilinearly using feed mechanisms of the type shown in the above-identified patents if the advantages of fanning the legs or tabs 104 are not required.

The legs 104 are provided with holding means 104A corresponding to the holding means 24A, 26A provided on the tabs 24, 26. These holding means 104A detachably or removably mount a fastener such as a screw 108. The screws 108 extend at an acute angle relative to the plane of the web 102 to permit inclined feeding in the manner described above. The direction of elongation of the screws 108 could be such as to extend parallel to the plane of the web 102 in those applications in which inclined feeding is not desired, and the tabs 104 extend generally perpendicular to the plane of the web 102.

FIGS. 10 and 11 illustrate a fastener strip 110 quite similar to the strip 100 except that the transversely extending legs or tabs 104 are provided with a fastener retaining means 104B adapted for use with cap screws 112 having, for example, a hexagonal head 112A. The holding means 104B utilize a bifurcation or slot 114 extending lengthwise through the tab or leg 104 and having an outwardly flared cup defining structure 116 for receiving the head 112A of the fastener 112 and an opening 118 through which the shank or body of the fastener 112 extends. The cup defining structure 116 is outwardly flared to provide a clearance between the head 112 and the structure 116 to permit rotary nut runners to engage the head 112A during a driving operation. As the rotating driver moves downwardly and couples with the head 112A, further downward movement splits or separates the two legs of the tab 104 formed by the slot 114 to permit the separation of the fastener 112 from the tab 104.

FIGS. 12 and 13 of the drawings illustrate a fastener strip construction which is indicated generally as 120, again using the web 102 and the transversely extending tabs 104. However, the free end portions of the tabs 104 are provided with an improved fastener retaining structure 104C that is designed to be removed or separated from the tab 104 during the driving operation to provide a plastic washer for a threaded fastener 122. The improved holding means 104C includes an opening 124 through which the shank of the fastener 122 extends with a head 122A on the fastener resting on the upper surface of the free end portion of the tab 104. One or a number of perforations 126 are provided in the body of the tab 104 to facilitate separation of the holding means 104C. During a driving operation when a downwardly moving and rotating driver couples with the recess in the head 122A of the screw 122, this rotary motion coupled with the downward movement of the driver shears the holding means 104C along the perforation 126 so that a plastic washer is provided immediately beneath the head 122A. Thus, when a screw 122 is driven into a workpiece, a plastic washer is interposed between the head 122A and the workpiece.

FIGS. 14 and 15 of the drawings illustrate a fastener strip indicated generally as 130, again using the web 102 with the plurality of transversely extending tab or leg portions 104. However, the free end portions of the tabs 104 are provided with an improved holding means indicated generally as 104D which mounts a nut 132 and is removable with the nut 132 during driving to provide an elastic body so that the nuts 132 are self-locking. More specifically, the holding means 104D comprises an upwardly extending body 134 of plastic material through which an opening 136 extends. The body 134 includes a circular rib 134A adjacent its lower end. The body 134 is formed integral with the tab 104 and at its upper end comprises a generally truncated conical section. One or a number of perforations 138 detachably connect the holding means 104D with the remainder of the tab 104.

The nut 132 is of substantially convention construction in including an internally threaded and centrally disposed opening 132A. A conical opening 132B is formed in the lower end of the nut 132 of dimensions slightly smaller than that of the body 134. The opening 132B also includes a groove matching the rib 134A formed on the body 134. Thus, when the strip 130 is manufactured, successive nuts 130 are snapped onto the fastener holding means 104D so that the plastic bodies 134 are disposed within and slightly compressed within the openings 132B with the rib 134A received in the matching groove in the wall of the cavity 132B.

When the nuts 132 are driven, the rotating driver moves downwardly to couple with the outer surface of the nut 132. This rotary movement shears the holding means 104D from the free end of the tab 104 and moves the nut 132 containing the elastic or plastic body 134 downwardly over a threaded post. The body 134 is distorted by the threads of the threaded member on which the nut 132 is driven to provide a self-locking nut of the type well known in the art.

Although the present invention has been described with reference to a number of illustrative embodiments thereof, it should be understood that numerous other modifications and embodiments can be devised by those skilled in the art that will fall within the spirit and scope of the principles of this invention.

What is claimed as new and desired to be secured by Letters Patent of the United States is:

1. An assemblage of fasteners comprising
   an elongated length of flexible web material,
   a pair of rows of tab portions projecting from the opposite edges of the web substantially transverse thereto, the tab portions in different rows being of different lengths and having fastener receiving means disposed at the outer free ends of the tab portions,
   and a plurality of headed fasteners each having a head portion and a shank portion, each fastener having its shank portion disposed in the fastener receiving means on one tab portion in each of the two rows.

2. The assemblage set forth in claim 1 in which
   the fastener receiving portion in one of the rows of tab portions is detachably connected to the tab portion and is removed from the assemblage and carried with the fastener when the fastener is removed from the assemblage.

3. The assemblage set forth in claim 1 in which
   the web portion includes means defining a bending axis transverse to the web and disposed between adjacent sets of tab portions.

4. The assemblage set forth in claim 3 including
   means joining opposite ends of the flexible web material to form a closed loop.

5. An assemblage of headed fasteners having a head portion and a depending body portion comprising:
   a length of flexible web material having a series of indexing means thereon;
   a single row of tab portions projecting transversely from the flexible web material adjacent one edge thereof, said tab portions being spaced from each other and each having a free end laterally spaced from the web material;
   fastener retaining means formed in the free end of each tab, each fastener retaining means including an opening through the free end of the tab;
   said fastener retaining means includes a detachable portion at the free end of the tab portion with the opening formed in the detachable portion;
   and a headed fastener disposed in each fastener retaining means with the head portion disposed above the free end of the tab portion to the side of the web material and with the body portion depending below the free end of the tab portion and below the web material.

6. The assemblage set forth in claim 5 in which
   the fastener retaining means includes a head locating structure projecting upwardly from the free end and adapted to at least partially surround the head portion of a fastener disposed in the fastener retaining means.

7. The assemblage set forth in claim 5 in which
   the row of tab portions extends from the web material at an acute angle.

8. The assemblage set forth in claim 5 in which
   the indexing means includes a row of longitudinally spaced openings in the web material, at least some of said openings being in a location disposed between successive tab portions to define a web bending axis between successive tab portions.

9. A strip of self-locking nuts comprising
   an elongated web of flexible material having a plurality of spaced projecting tabs,
   an apertured elastic retaining body on each of the tabs,
   and a plurality of nuts each having an internally threaded opening and an internal cavity, each of said nuts being mounted on one of the tabs with the elastic retaining body disposed in the internal cavity in the nut and with the openings in the nut and the elastic retaining body aligned with each other.

10. A method of making a strip of self-locking threaded fasteners which comprises the steps of
    forming an elongated web having a plurality of spaced tab portions with integrally formed apertured and elastic retaining bodies, said bodies having locking means thereon,
    and mounting an apertured threaded fastener with a locking means on each of the elastic retaining bodies with the locking means on the fastener and tab portion in an interlocking relation.

11. A screw package comprising:
a carrier strip of flat sheet material having a series of holes;
means defining circular lines of weakness in said strip partly surrounding each of said holes whereby a prospective flat washer is defined in said strip; and
a plurality of screws having heads and shanks, said heads having entirely flat undersides disposed against the uppermost surface of said strip, and said shanks extending through said holes and having a snug screw-retaining fit with said strip in said holes.

12. A screw-package according to claim 11 in which said flat sheet material has the physical properties of nylon.

13. A strip of screw fasteners comprising a carrier strip of elongated flexible material including a series of fastener retaining means for retaining a fastener, each said fastener retaining means including an opening, means defining lines of weakness in said material partly surrounding said openings to define said fastener retaining means and facilitate separation of said fastener retaining means from said carrier strip, a plurality of fasteners including heads and shanks, each said head including an underside positioned on an upper side of said strip with each said shank extending through one of said openings with a sufficient fit to retain said shank in said opening.

14. The strip claimed in claim 13 wherein said fastener retaining means comprises a washer.

15. The strip claimed in claim 13 wherein said means defining lines of weakness comprises at least one perforation in said material leaving insubstantial portions of material around said opening to facilitate separation of said fastener retaining means from said strip.

16. A screw package comprising
a carrier strip of flat sheet material having a series of holes;
means defining curved lines of weakness in said strip partially surrounding each of said holes whereby a prospective flat washer is defined in said strip; and
a plurality of screws having heads and shanks, said heads having entirely flat undersides disposed against the uppermost surface of said strip, and said shanks extending through said holes and having a snug screw-retaining fit with said strip in said holes.

17. A strip of headed fasteners comprising a carrier strip of elongated flexible material including a series of fastener retaining means for retaining a fastener, each said fastener retaining means including an opening defined in the strip, means defining lines of weakness in said strip partially surrounding said openings to define said fastener retaining means and facilitate separation of said fastener retaining means from said carrier strip, a plurality of fasteners including heads and shanks, each said head including an underside positioned on an upper side of said strip with each said shank extending through one of said openings with a sufficient fit to retain said shank in said opening.

18. A fastener package comprising a carrier strip of flat sheet material, said strip of flat sheet material including a series of circular prospective flat washers, each prospective washer including a centrally located hole extending through said flat sheet material, a plurality of fasteners each having a head and a shank, said shanks extending through said holes and having a fastener retaining fit in said holes for retaining said fasteners in said carrier strip, said heads having undersides overlying said prospective washers, said prospective washers being at least as large as the undersides of said fastener heads, and said carrier strip of flat sheet material including means defining lines of weakness separably interconnecting each said prospective washer and an adjacent portion of said carrier strip.

19. A screw package comprising a carrier strip of flat sheet material, said strip of flat sheet material including a series of circular prospective flat washers, each prospective washer including a centrally located hole extending through said flat sheet material, a plurality of screws each having a head and a shank, said shanks extending through said holes and having a snug screw retaining fit in said holes for retaining said screws in said carrier strip, said heads having entirely flat undersides overlying the uppermost surface of said prospective washers, said prospective washers being at least as large as the undersides of said screw heads, and said carrier strip of flat sheet material including means defining lines of weakness separably interconnecting each said prospective washer and an adjacent portion of said carrier strip.

* * * * *